Jan. 8, 1963   M. WIESSNER ETAL   3,072,030
EXPOSURE CONTROL MECHANISM FOR CAMERAS
Filed Nov. 4, 1960
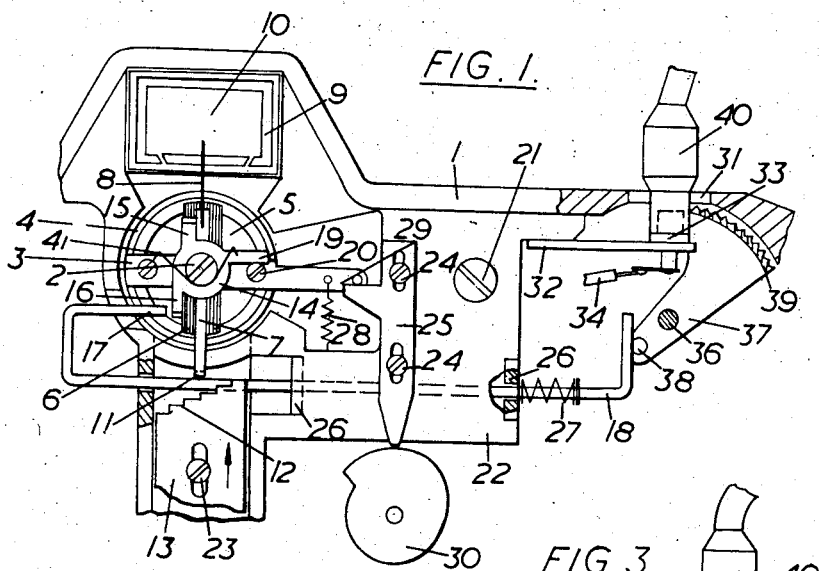
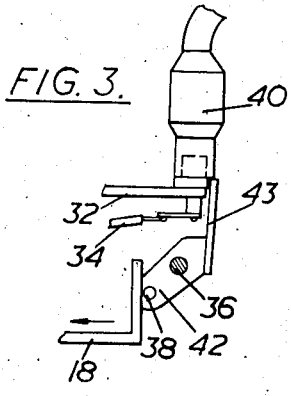
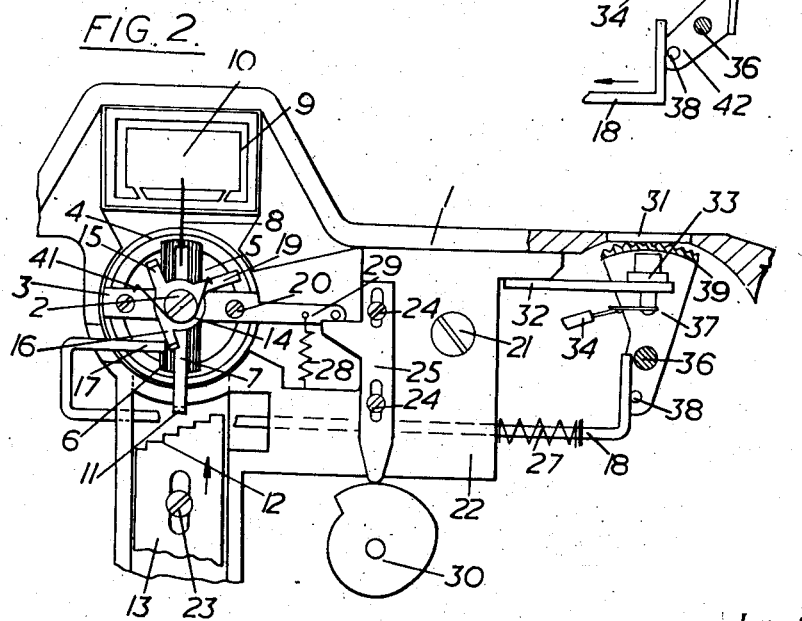
Inventors
MANFRED WIESSNER
WALTER HENNIG
ERHARD LOOSE
By Irwin A. Thompson
         Attorney United States Patent Office 3,072,030
Patented Jan. 8, 1963

3,072,030
EXPOSURE CONTROL MECHANISM
FOR CAMERAS
Manfred Wiessner, Walter Hennig, and Erhard Loose, Dresden, Germany, assignors to VEB Kamera- und Kinowerke Dresden, Dresden, Germany
Filed Nov. 4, 1960, Ser. No. 67,379
4 Claims. (Cl. 95—10)

The present invention relates to a photographic camera with diaphragm settable by an exposure control mechanism and a flash-lighting device synchronized with the running-off of the shutter.

Cameras of this type have already become known, wherein for the purpose of the execution of flash-light exposures the automatic setting of the diaphragm is eliminated. The diaphragm is then settable by hand independently of the exposure control mechanism, the diaphragm value being ascertainable by calculation by the photographer as a value depends upon the flash guide number and the distance. Setting devices for the exposure factors diaphragm and distance for the requirements of flash exposures have also already become known, which however require either a greater expense for structural parts or additional observation of scales which oppose automation of setting operations.

The aim of the invention is the avoidance of the above disadvantages by the provision of a new change-over device for the exposure control mechanism, from daylight exposures to flash exposures.

In accordance with the invention this is achieved due to the fact that a shift lever provided for the change-over of the exposure control mechanism from daylight exposures to flash exposures is couplable with a stop limiting the running-off of the diaphragm setting member. In this manner, the exposure control mechanism is not eliminated, but only the upper limit value for the diaphragm apertures is fixed. The shift lever equipped preferably with a cap covering the flash-light connection nipple is in engagement, according to a special feature of the invention, with a locking lever which can be pivoted into the path of the arm connected with the moving coil. This locking lever is more expediently drawn by a spring against a stop, which is arranged on the system carrier or the return ring, with regard to the adjustability of the measuring mechanism, for the purpose of taking into consideration further exposure factors such as flash guide number and film sensitivity.

The details of the invention may be seen from an illustrated and described example of embodiment.

FIGURES 1 and 3 show the exposure control mechanism set for flash exposures; and FIGURE 2 shows the exposure control mechanism set for daylight exposures.

In the camera housing 1 the core magnet measuring mechanism consisting of system carrier 3, return ring 4, core magnet 5 and moving coil 6 is arranged for rotation about the screw 2. With the moving coil 6 there is connected the arm 7, the pointer 8 of which is visible in the light frame 9 of the viewfinder 10, and the stop 11 of which swings in the path of the stepped cam 12 of the diaphragm setting member 13. There is further rotatably arranged about the screw 2 the locking lever 14, the first arm 15 of which lies in the path of the arm 7 and the second arm 16 of which lies in the path of the projection 17 of the switch rod 18, while its third arm 19 cooperates with the stop 20.

In the camera housing 1 there is secured by means of screws 21 the plate 22, in which there are mounted screws 23 and 24 which serve for the guidance of the diaphragm setting member 13 and of the setting slider 25.

Furthermore, in lugs 26 of the plate 22 there is mounted the switch rod 18 supporting itself through the spring 27 away from the plate 22. The setting slider 25 is pressed by the spring 28 through the arm 29 of the system carrier 3 against the setting cam 30.

Behind the opening 31 in the camera housing 1 there is secured on the lug 32 of the plate 22 the flash-light connection nipple 33, which is connected through the lead 34 with a switch (not shown separately) controlled by the running-off of the shutter. The switch lever 37, pivotable about the shaft 36, is in engagement through the pin 38 with the switch rod 18 and possesses the cap 39, which can be placed behind the opening 31. Thus access to the flash-light connection nipple 33 is blocked for the cable plug 40.

The manner of operation of the device is as follows:

If an exposure is to be effected using flash-light, firstly the cap 39 must be pivoted away in order that the cable plug 40 may be connected with the flash-light connection nipple 33. This is effected by pivoting away of the switch lever 37 in the clockwise direction, whereby the pin 38 displaces the switch rod 18 against the action of the spring 27. Thus the projection 17 of the switch rod 18 departs from the arm 16 of the locking lever 14, so that the spring 41 can rotate the locking lever 14 in the clockwise direction, until the arm 19 abuts against the stop 20. Here the arm 15 entrains the arm 7 and thus the moving coil 6 against the action of the return spring (not shown). In this manner the maximum diaphragm aperture settable by the exposure control mechanism is determined, which aperture cannot be exceeded, despite inadequate brightness. This diaphragm aperture is expediently ascertained by reference to the distance to be expected as a rule in the case of flash-light exposures. Minor deviations from this basic distance remain without influence upon the exposure of the film.

If flash-light is to be used additionally in the case of daylight exposures, in order to brighten dark parts, as a result of the existing brightness the moving coil 6 will rotate against its return spring and lift the arm 7 away from the arm 15 of the locking lever 14. The arm 7 then assumes a position which corresponds to the existing brightness. The exposure of the film will be correct in this case also.

Further exposure factors such as flash guide number and film sensitivity can be taken into consideration by rotation of the setting cam 30, when the core magnet measuring mechanism 3 to 7 is rotated against the action of the spring 28, through the setting slider 25 guided in screws 24 and the arm 29. Here at the same time the upper limit value of the diaphragm aperture is varied. On release of the shutter mechanism (not shown here) the diaphragm setting member 13 will move in known manner in the direction of the arrow towards the stop 11 of the arm 7, in order to set the diaphragm, coupled with the diaphragm setting member 13, according to the position of the moving coil 6.

A further embodiment is illustrated in FIGURE 3. There the lug 43 of the switch lever 42 extends into the path of the attachable cable plug 40. In this manner without special manual operation by the photographer, the switch lever 42 is pivoted about the shaft 36 and the switch rod 18 is moved in the direction of the arrow, solely by the movement of attachment of the cable plug 40. The shaft 36 here more expediently extends through the slot 44 provided in the switch lever 42.

We claim:

1. In a photographic camera having a housing, a shutter device mounted on the housing, a moving coil exposure meter device mounted in the housing on a rotatable carrier and having a first movable stop member carried by the moving coil, a diaphragm aperture in the housing, aperture setting means cooperable with said first stop member of the exposure meter device, aperture driving means releasable on operation of the shutter device to drive the aperture until an aperture size is obtained which is determined by the position of said first stop member, and an electric flash-light circuit including a switch which is synchronised to close on operation of the shutter for picture taking; the provision of a projection on said carrier, a second stop member rotatably mounted on the same axis as the carrier, said second stop member having a first arm movable into the path of movement of the first stop member, for limiting the normal range of movement of the latter, and a second arm which is spring urged towards the projection on the carrier and a lever pivotally mounted on the housing and arranged to effect displacement of said second stop member whereby in one position of the lever said first arm is clear of the path of movement of the first stop member during normal daylight picture-taking and in another position of the lever said first arm is situated in said path of movement during flash-light picture taking.

2. In a photographic camera having a housing, a shutter device mounted on the housing, a moving coil exposure meter device mounted in the housing on a rotatable carrier and having a movable stop member carried by the moving coil, a diaphragm aperture in the housing, aperture setting means cooperable with said stop member of the exposure meter device, aperture driving means releasable on operation of the shutter device to drive the aperture until an aperture size is obtained which is determined by the position of the stop member, and an electric flash-light circuit including a switch which is synchronised to close on operation of the shutter for picture taking; the provision of means movable into the path of movement of the stop member, for limiting the normal range of movement of the latter, a lever pivotally mounted on the housing and arranged to effect displacement of said means whereby in one position of the lever said means is clear of the path of movement of the stop member during normal day-light picture-taking and in another position of the lever said means is situated in said path of movement during flash-light picture-taking, a cam mounted in the housing for rotation into a position according to the value of an exposure factor other than diaphragm aperture value and a cam follower slidably mounted within the housing and in engagement with the cam, which cam follower is engageable with said carrier to rotate the latter to correct the combined exposure value.

3. In a photographic camera having a housing, a shutter device mounted on the housing, a moving coil exposure meter device mounted in the housing having a movable stop member carried by the moving coil, a diaphragm aperture in the housing, aperture setting means cooperable with said stop member of the exposure meter device, aperture driving means releasable on operation of the shutter device to drive the aperture until an aperture size is obtained which is determined by the position of the stop member, and an electric flash-light circuit including a switch which is synchronised to close on operation of the shutter for picture taking and a contact nipple for receiving the electrical plug attachment of a flash-light mechanism, said contact nipple being arranged adjacent an opening in the housing; the provision of means movable into the path of movement of the stop member, for limiting the normal range of movement of the latter, a lever pivotally mounted on the housing adjacent said opening therein and arranged to actuate said means for displacement thereof for alternate daylight picture-taking and flash-light picture-taking, the lever being so arranged in relation to the nipple and the opening that with the plug attachment of the flash-light mechanism in engagement with the nipple, the lever is blocked by the plug so that it cannot be moved from the position for flash-light picture-taking, and a cap connected to said lever to close the opening when the lever is in a position for daylight picture-taking and to uncover the opening when the lever is in the position for flash-light picture-taking.

4. In a photographic camera having a housing, a shutter device mounted on the housing, a moving coil exposure meter device mounted in the housing having a movable stop member carried by the moving coil, a diaphragm aperture in the housing, aperture setting means cooperable with said stop member of the exposure meter device, aperture driving means releasable on operation of the shutter device to drive the aperture until an aperture size is obtained which is determined by the position of the stop member, and an electric flash-light circuit including a switch which is synchronised to close on operation of the shutter for picture taking and a contact nipple for receiving the electrical plug attachment of a flash-light mechanism, said contact nipple being arranged adjacent an opening in the housing; the provision of means movable into the path of movement of the stop member, for limiting the normal range of movement of the latter, a lever pivotally mounted on the housing adjacent opening therein and arranged to actuate said means for displacement thereof for alternate daylight picture-taking and flash-light picture-taking, and a lug connected to said lever which extends into the path of movement of the plug attachment whereby the lever is displaced on the engagement of the plug attachment with the nipple.

References Cited in the file of this patent
UNITED STATES PATENTS
2,999,439    Nerwin _____ Sept. 12, 1961